(12) United States Patent
Funakura

(10) Patent No.: US 9,027,953 B2
(45) Date of Patent: May 12, 2015

(54) FOLDABLE STROLLER

(75) Inventor: Kenji Funakura, Tokyo (JP)

(73) Assignee: Combi Corporation, Tokyo-to (JP)

( * ) Notice: Subject to any disclaimer, the term of this patent is extended or adjusted under 35 U.S.C. 154(b) by 200 days.

(21) Appl. No.: 13/574,424

(22) PCT Filed: Jan. 20, 2011

(86) PCT No.: PCT/JP2011/050977
§ 371 (c)(1),
(2), (4) Date: Aug. 31, 2012

(87) PCT Pub. No.: WO2011/090116
PCT Pub. Date: Jul. 28, 2011

(65) Prior Publication Data
US 2013/0009388 A1    Jan. 10, 2013

(30) Foreign Application Priority Data
Jan. 22, 2010  (JP) ................................. 2010-012457

(51) Int. Cl.
*B62B 7/08*   (2006.01)
*B62B 9/10*   (2006.01)
*B62B 9/20*   (2006.01)

(52) U.S. Cl.
CPC . *B62B 7/08* (2013.01); *B62B 9/104* (2013.01); *B62B 9/203* (2013.01)

(58) Field of Classification Search
CPC .......... B62B 7/06; B62B 7/062; B62B 7/064; B62B 7/08; B62B 7/086; B62B 9/104; B62B 9/203
USPC .................. 280/642–644, 647–650, 657, 658
See application file for complete search history.

(56) References Cited

U.S. PATENT DOCUMENTS

| | | | |
|---|---|---|---|
| 5,725,238 A * | 3/1998 | Huang | 280/642 |
| 6,581,957 B1 * | 6/2003 | Lan | 280/642 |
| 6,698,788 B2 * | 3/2004 | Yang | 280/647 |
| 6,951,342 B2 * | 10/2005 | Lan | 280/47.4 |
| 7,182,363 B2 * | 2/2007 | Takubo et al. | 280/644 |
| 7,445,230 B2 * | 11/2008 | Kassai et al. | 280/644 |
| 7,458,599 B2 * | 12/2008 | Kassai et al. | 280/642 |
| 7,871,100 B2 * | 1/2011 | Chen et al. | 280/642 |
| 8,042,828 B2 * | 10/2011 | Ageneau et al. | 280/642 |
| 8,113,523 B2 * | 2/2012 | Mountz | 280/47.4 |
| 8,366,127 B2 * | 2/2013 | Zhong et al. | 280/47.4 |
| 2004/0140648 A1 | 7/2004 | Takubo et al. | |
| 2007/0132207 A1 | 6/2007 | Moriguchi et al. | |
| 2010/0109271 A1 | 5/2010 | Funakura | |
| 2010/0156160 A1 * | 6/2010 | Ohnishi | 297/354.13 |
| 2011/0175306 A1 * | 7/2011 | Newhard | 280/47.4 |

FOREIGN PATENT DOCUMENTS

CN          2528680 Y      1/2003
CN        201367044 Y     12/2009
(Continued)

*Primary Examiner* — Katy M Ebner
(74) *Attorney, Agent, or Firm* — Birch, Stewart, Kolasch & Birch, LLP

(57) ABSTRACT

A stroller includes a stroller body having a frame member and an armrest, a back part frame pivotably joined to the stroller body, and a support member connecting the armrest and the back part frame with each other. The support member has a flexibility so as to allow the back part frame to be pivoted with respect to the stroller body within a predetermined range. The support member makes it possible that the back part frame is pivoted with respect to the stroller body, in conjunction with the folding action of the stroller body.

8 Claims, 7 Drawing Sheets

(56) References Cited

FOREIGN PATENT DOCUMENTS

| JP | 55-131873 U | 9/1980 |
| JP | 2004-216996 A | 8/2004 |
| JP | 2005-082082 A | 3/2005 |
| JP | 2006-117012 A | 5/2006 |
| JP | 2007-098996 A | 4/2007 |
| JP | 2007-099000 A | 4/2007 |
| JP | 2008-254693 A | 10/2008 |

* cited by examiner

FOLDABLE STROLLER

TECHNICAL FIELD

The present invention relates to a stroller including a foldable stroller body, and a back part frame pivotably joined to the stroller body, wherein the back part frame can be stably pivoted with respect to the stroller body in conjunction with the folding action of the stroller body.

BACKGROUND ART

Strollers for carrying a baby have been conventionally known. Almost all strollers used in these days are foldable. Like a stroller disclosed in JP2005-082082A, many strollers are configured to be foldable such that a front leg and a handle come close to each other, in side view. Due to this structure, a size of the folded stroller in the back and forth direction can be reduced. In addition, in the stroller disclosed in JP2005-082082A, the stroller folded in the back and forth direction can be further folded about two axis lines extending in the up and down direction on two positions that are spaced apart from each other in the width direction of the stroller. Thus, the size of the folded stroller can be reduced also in the width direction thereof.

In addition, as disclosed in JP2005-082082A, the stroller generally includes a back part frame. The back part frame has a function for supporting a back part of a seat and/or a function for protecting an upper body of a baby carried by the stroller. In order to impart a reclining mechanism to the stroller, the back part frame is pivotable with respect to the stroller body. In addition, as disclosed in JP2005-082082A and JP2006-117012A, the stroller is provided with an adjusting mechanism (generally a string and an adjuster for adjusting a length of the string) for adjusting an inclination angle of the back part frame and the back part of the seat. Further, the stroller is provided with a support member that supports the back part frame, lest the back part frame is inclined at an angle over a predetermined inclination angle, regardless of the adjustment by the adjusting mechanism.

When the back part frame and the back part of the seat are inclined rearward from the stroller body, after the stroller body has been folded in the back and forth direction, the back part frame and the back part of the seat remain extending rearward from the folded stroller body. Namely, even when the stroller is folded, the size of the stroller as a whole cannot be sufficiently reduced to a size suitable for, e.g., storage, unless the inclined back part frame and the back part of the seat are returned to an upright state by the aforementioned adjusting mechanism. On the other hand, it is bothersome, for each time when the stroller body is folded, to adjust the inclination angle of the back part frame and the back part of the seat by the aforementioned adjusting mechanism, separately from the folding operation of the stroller body.

In order to cope with this problem, in the stroller disclosed in JP2005-082082A, during the folding action, an end of an armrest being pivoted is engaged with an end of the back part frame (head guard) so as to raise the back part frame. On the other hand, in the stroller disclosed in JP2006-117012A, during the folding action, an armrest being pivoted raises the back part frame (protection frame) through a link member.

However, in the technique disclosed in JP2005-082082A, a joint position of the back part frame to the stroller body is limited. Similarly, also in the technique disclosed in JP2006-117012A, a joint position of the back part frame to the stroller body is limited, in order to reduce a length of the link member with a view of ensuring a stable action of the link member. Namely, in the techniques disclosed in JP2005-082082A and JP2006-117012A, although the back part frame can be automatically raised, the attachment position of the back part frame to the stroller body is limited. Thus, when the techniques disclosed in JP2005-082082A and JP2006-117012A are applied to every stroller, there is a possibility that the back part frame might not be located on a proper position, whereby a desired function cannot be given to the back part frame.

In the first place, the conventional stroller is provided with several separate mechanism, such as an automatic raising mechanism, a reclining angle adjusting mechanism and a support member for restricting an inclination angle, in relation to the reclining of a back part frame and a back part of a seat. To simplify these mechanisms is particularly desired.

DISCLOSURE OF THE INVENTION

The present invention has been made in view of the above circumstances. The object of the present invention is to provide a stroller including a foldable stroller body and a back part frame disposed on the stroller body, wherein the back part frame can be stably pivoted with respect to the stroller body, in conjunction with the folding action of the stroller body.

A stroller according to one aspect of the present invention comprises: a stroller body including a frame member and an armrest pivotably joined to the frame member, the stroller body being capable of being folded from an unfolded state to a folded state; a back part frame joined to the stroller body for supporting a back part of a seat to be mounted on the stroller body, the back part frame being pivotable with respect to the stroller body about an axis line whose relative position with respect to the frame member is constant during a folding action of the stroller body; and a support member joined to the armrest and to the back frame part so as to connect the armrest and the back part frame with each other, the support member having a flexibility so as to allow the back part frame to be pivoted with respect to the stroller body within a predetermined range; wherein the support member is positioned such that the back part frame is pivoted with respect to the stroller body, in conjunction with a pivoting movement of the armrest with respect to the frame member during the folding action of the stroller body.

In the stroller according to the aspect of the present invention, the support member may be joined at a position on the armrest, the position being more distant from a pivot axis line of the back part frame with respect to the stroller body, when in the folded state than in the unfolded state.

In addition, in the stroller according to the aspect of the present invention, when in the unfolded state, a joint position of the support member to the armrest may be closer to a pivot axis line of the back part frame with respect to the stroller body than a pivot axis line of the armrest with respect to the frame member is, and when in the folded state, the pivot axis line of the armrest with respect to the frame member may be closer to the pivot axis line of the back part frame with respect to the stroller body than the joint position of the support member to the armrest is.

Further, in the stroller according to the aspect of the present invention, the support member may be pivotably joined to at least one of the armrest and the back part frame.

Further, in the stroller according to the aspect of the present invention, when observed along a direction in parallel with a pivot axis line of the back part frame with respect to the stroller body, a joint position of the support member to the back part frame may be located on the same side in the unfolded state and in the folded state, with respect to a straight line connecting the pivot axis line of the back part frame with respect to the stroller body and a pivot axis line of the armrest with respect to the frame member, and a joint position of the support member to the armrest may be located on the same side in the unfolded state and in the folded state, with respect to the straight line connecting the pivot axis line of the back part frame with respect to the stroller body and the pivot axis line of the armrest with respect to the frame member.

Further, in the stroller according to the aspect of the present invention, when observed along a direction in parallel with a pivot axis line of the back part frame with respect to the stroller body, a straight line segment connecting a joint position of the support member to the back part frame and a joint position of the support member to the armrest may intersect with a straight line segment connecting a pivot axis line of the back part frame with respect to the stroller body and a pivot axis line of the armrest with respect to the frame member.

Further, in the stroller according to the aspect of the present invention, when observed along a direction in parallel with the pivot axis line of the back part frame with respect to the stroller body, when the stroller is folded from the unfolded state to the folded state, a straight line segment connecting the pivot axis line of the back part frame with respect to the stroller body and the joint position of the support member to the back part frame may not pass the straight line connecting the pivot axis line of the back part frame with respect to the stroller body and the pivot axis line of the armrest with respect to the frame member, and when the stroller is folded from the unfolded state to the folded state, a straight line segment connecting the pivot axis line of the armrest with respect to the frame member and the joint position of the support member to the armrest may not pass the straight line connecting the pivot axis line of the back part frame with respect to the stroller body and the pivot axis line of the armrest with respect to the frame member.

Further, in the stroller according to the aspect of the present invention, when the armrest is pivoted with respect to the frame member during the folding action of the stroller body, the back part frame may be pivoted with respect to the stroller body such that an inclination angle of the back part frame with respect to the frame member becomes smaller in side view.

Further, in the stroller according to the aspect of the present invention, the stroller body may further include a front leg and a rear leg which are pivotably joined to the armrest, and a connection bracket pivotably joined to the rear leg and to the frame member so as to connect the rear leg and the frame member with each other, and the back part frame may be pivotable with respect to the stroller body about an axis line which is the same as a pivot axis line between the frame member and the connection bracket.

Further, in the stroller according to the aspect of the present invention, the back part frame may be pivotably joined, at an end portion thereof, to the stroller body.

Further, the aspect according to the aspect of the present invention may further include a handle that is swingable with respect to the stroller body. Alternatively, in the stroller according to the aspect of the present invention, the frame member may constitute a handle.

According to the present invention, the back part frame can be stably pivoted with respect to the stroller body, in conjunction with the pivoting movement of the armrest with respect to the frame member during the folding action of the stroller body. In addition, the overall structure of the stroller can be simplified.

MODE FOR CARRYING OUT THE INVENTION

Figure 1:
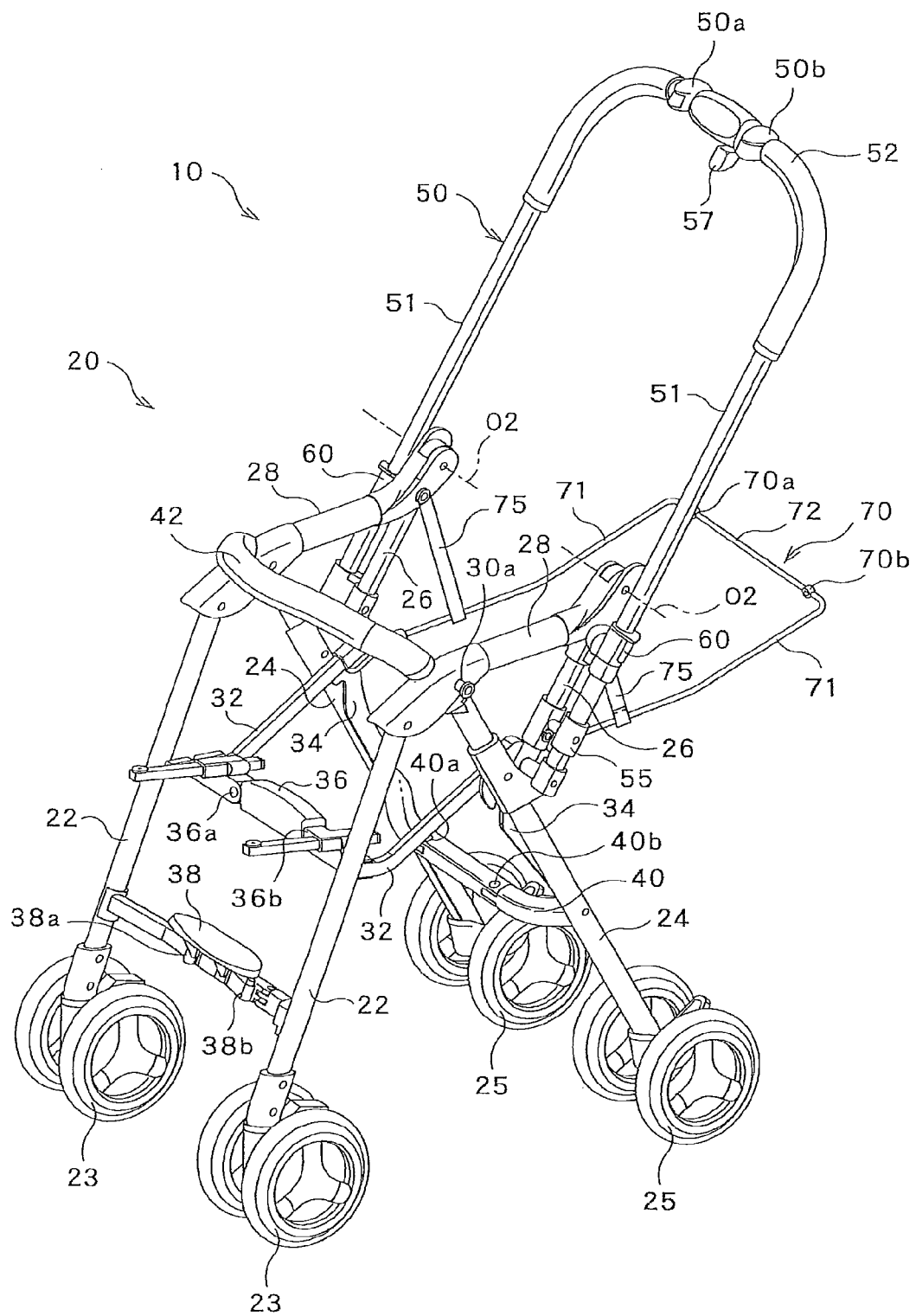
FIG. 1 is a perspective view showing an overall structure of a stroller in one embodiment of the present invention.

FIGS. 1 to 6 are views for explaining one embodiment of a stroller according to the present invention. FIGS. 1 to 5 show an overall structure of the stroller. As shown in FIGS. 1 to 5, a stroller 10 in this embodiment includes: a stroller body 20 having a frame member 26, an armrest 28 pivotably joined to the frame member 26, and a front leg 22 and a rear leg 24 pivotably joined to the armrest 28; and a handle 50 swingably joined to the stroller body 20. A front wheel 23 is rotatably supported on a lower end of the front leg 22 of the stroller body 20, and a rear wheel 25 is rotatably supported on a lower end of the rear leg 24 of the stroller body 20.

In this embodiment, like a prevalently used stroller (e.g., JP2005-082082A and JP2006-117012A), the stroller 10 is configured to be foldable. In the stroller 10 in this embodiment, by swinging the handle 50 with respect to the stroller body 20, an operator (caregiver) can steer the stroller 10, grasping the handle 50 from the backside of the baby, so as to drive the stroller 10 with the baby facing forward in the traveling direction, and can steer the stroller 10, grasping the handle 50 from the position on the side of the front leg at which the operator faces the baby, so as to drive the stroller 10 with the rear leg side of the stroller 10 facing forward in the traveling direction.

In this specification, the terms "front", "rear", "up", "down", "back and forth direction", and "up and down direction" with respect to the stroller mean, unless otherwise specified, "front", "rear", "up", "down", "back and forth direction", and "up and down direction", with respect to a baby in the unfolded stroller 10. More specifically, the "back and forth direction" of the stroller 10 corresponds to a direction connecting a lower left part and an upper right part in a plane of FIG. 1, and a right and left direction in a plane of each of FIGS. 2 and 3. Unless otherwise specified, the "front" is a side to which the baby in the stroller faces. The lower left side in the plane of FIG. 1 and the left side of the plane of each of FIGS. 2 and 3 correspond to the front side of the stroller 10. The "up and down direction" of the stroller 10 is a direction perpendicular to the back and forth direction, and is a direction perpendicular to the ground on which the stroller 10 rests. Thus, when the ground surface is a horizontal surface, the "up and down direction" represents a vertical direction. The "lateral direction" is a width direction, and is a direction perpendicular both to the "back and forth direction" and the "up and down direction".

An overall structure of the stroller is firstly described. As shown in FIG. 1, the stroller 10 in this embodiment has substantially a symmetrical structure as a whole, with respect to a lateral center plane extending along the back and forth direction. As shown in FIG. 1, the stroller body 20 in this embodiment includes a pair of right and left front legs 22, a pair of right and left rear legs 24, a pair of right and left armrests 28 and a pair of right and left frame members 26.

An upper end portion of the front leg 22 is pivotably (swingably) joined to a front portion of the corresponding (right or left) armrest 28. Similarly, an upper end portion of the rear leg 24 is pivotably (swingably) joined to a front portion of the corresponding (right or left) armrest 28. In addition, an upper end portion of the frame member 26 is pivotably (swingably) joined to the corresponding (right or left) armrest 28.

The stroller body 20 further includes a left lateral connection member 32 that connects the left front leg 22 and the left frame member 26, and a right lateral connection member 32 that connects the right front leg 22 and the right frame member 26. A front portion of each of the lateral connection members 32 is pivotably joined to an intermediate portion of the front leg 22. A rear portion of each of the lateral connection members 32 is pivotably joined to a lower portion of the frame member 26. The stroller body 20 further includes a left connection bracket 34 that connects the left rear leg 24 and the left frame member 26, and a right connection bracket 34 that connects the right rear leg 24 and the right frame member 26. Each of the brackets 34 is pivotably (swingably) joined, at one portion thereof, to an intermediate portion of the rear leg 24, and is pivotably joined, at another portion thereof, to a lower portion of the frame member 26.

As laterally extending constituent elements, the stroller 10 according to this embodiment includes a footrest (front connection bar) 38 that connects the pair of front legs 22, an upper connection bar 36 that connects the pair of lateral connection members 32, and a rear connection bar 40 that connects the pair of rear legs 24. The upper connection bar 36, the footrest 38 and the rear connection bar 40 have a pair of hinges 36a and 36b, a pair of hinges 38a and 38b and a pair of hinges 40a and 40b, respectively, which are spaced apart from each other along the width direction (see FIGS. 1 and 5). In addition, a bendable guard member 42 is detachably provided between the pair of armrest 28.

Figure 2:
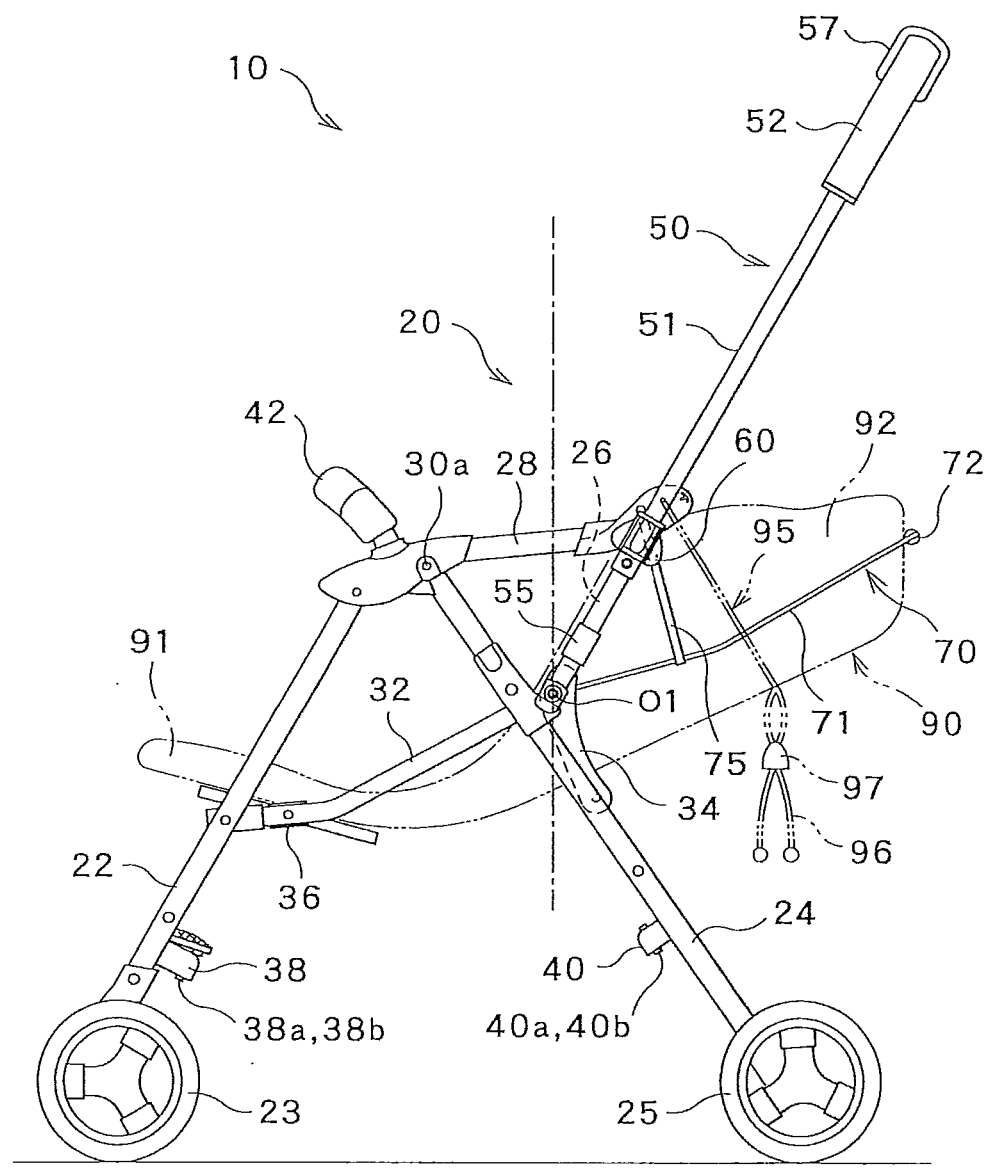
FIG. 2 is a side view showing the stroller in which a handle is located on a second position (backside pushing position).
Figure 3:
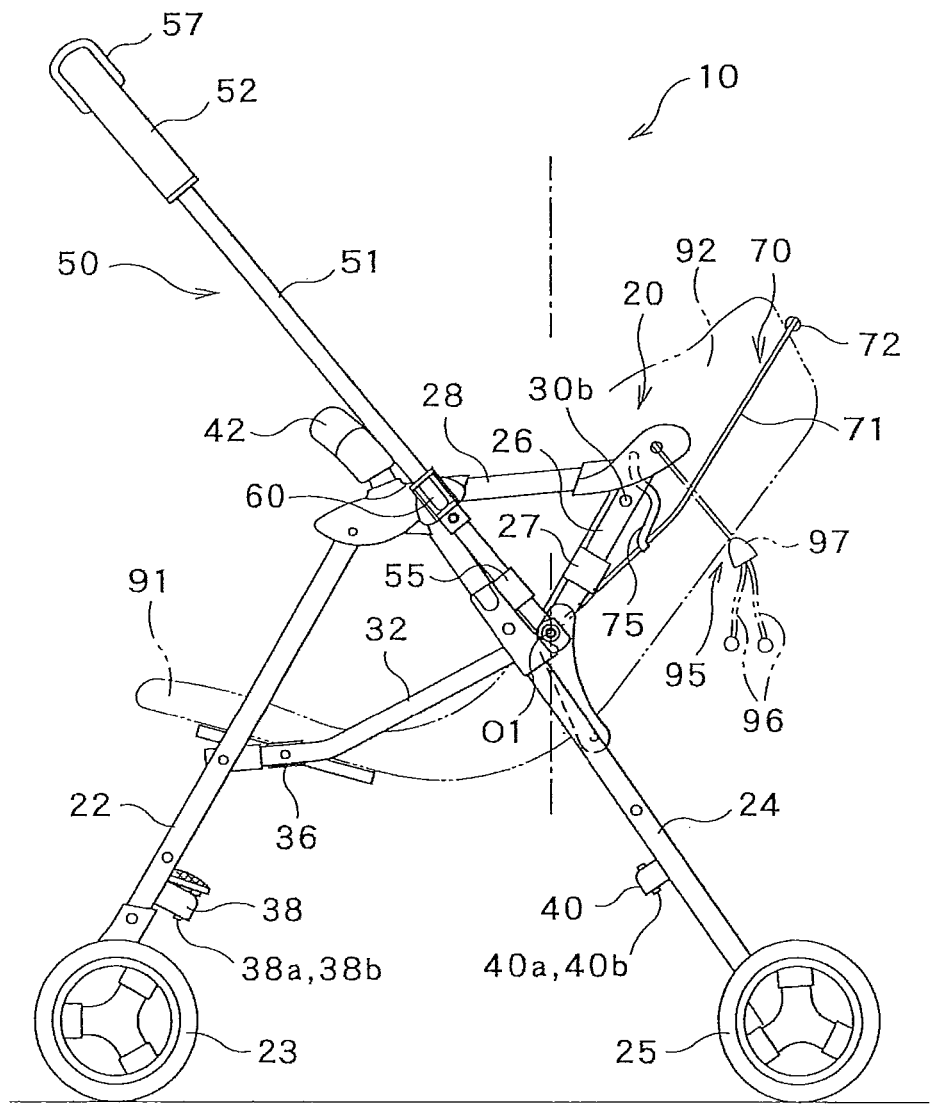
FIG. 3 is a side view showing the stroller in which the handle is located on a first position (face-to-face pushing position).

The handle 50 is swingably joined to the stroller body 20 as structured above. As shown in FIG. 1, in this embodiment, the handle 50 includes a pair of linear portions (extending portions) 51 extending substantially linearly in parallel with each other, and an intermediate portion 52 that connects the pair of linear portions 51. The handle 50 generally has a substantially U-shape. Opposed ends of the U-shaped handle 50 are pivotably (swingably) joined to the corresponding connection brackets 34. A pivot axis line (swing center) O1 of the handle 50 with respect to the connection bracket 34 corresponds to a pivot axis line O1 between the connection bracket 34 and the frame member 26 and a pivot axis line O1 between the frame member 26 and the lateral connection member 32, and extends in the lateral direction (width direction). Due to this structure, as shown in FIGS. 2 and 3, the handle can be swung with respect to the stroller body 20, and the linear potions 51 of the handle 50 can be moved on the lateral sides of the armrests 28 along the armrests 28. A pair of hinges 50a and 50b, which are spaced apart from each other in the width direction, are disposed on the intermediate portion 52 of the handle 50, so that the handle 50 can be bended.

On the pair of linear portions 51 of the handle 50, which can be moved on the lateral sides of the armrests 28, there are respectively provided sliding members 60 slidable with respect to the linear portions 51. On the corresponding linear portion 51 of the handle 50, each of the sliding members 60 is urged downward (toward the ends of the U-shape) by a spring (not shown) disposed in the liner portion 51.

On the other hand, as shown in FIGS. 2 and 3, the stroller body 20 is provided with a pair of first engagement portions (first engagement projections) 30a and a pair of second engagement portions (second engagement projections) 30b which are respectively engaged with the pair of sliding members 60 so as to restrict the pivotal movement of the handle 50. As shown in FIG. 3, when the first engagement projection 30a disposed forward and the sliding member 60 are engaged and locked with each other, the handle 50 is fixed on a first position (face-to-face pushing position). On the other hand, as shown in FIG. 2, when the engagement projection 30b disposed rearward and the sliding member 60 are engaged and locked with each other, the handle 50 is fixed on a second position (backside pushing position).

The handle 50 further includes operation members 55 slidably disposed on the linear portions 51, and a remote operation device 57 disposed on the intermediate portion 52. The remote operation device 57 is capable of remotely operate the operation members 55. In the unfolded stroller 10, when the handle 50 is fixed on the second position, the operation members 55 on the handle 50 are brought, from below, into contact with unlocking members 27 slidably disposed on the frame members 26. The frame member 26 includes a locking mechanism (not shown) that fixes the frame member 26 onto the rear leg 24 so as to maintain the stroller 10 (stroller body 20) in the unfolded state. When the unlocking member 27 is slid upward, the unlocking member 27 is configured to release the not-shown locking mechanism that fixes the frame member 26 onto the rear leg 24.

In addition, the stroller 10 includes a back part frame 70 pivotably joined to the stroller body 20. The back part frame 70 includes a pair of side parts 71 pivotably joined to the stroller body 20, and a connection part 72 that connects the pair of side parts 71. Hinges 70a and 70b are provided on positions at which the side parts 71 and the connection part 72 are joined to each other. A pivot axis line (swing center) O1 of the side part 71 with respect to the stroller body 20 corresponds to a pivot axis line (swing center) O1 of the handle 50 with respect to the stroller body 20, a pivot axis line O1 between the bracket 34 and the frame member 26 and a pivot axis line O1 between the frame member 26 and the lateral connection member 32. The back part frame 70 is formed of, e.g., a metal or the like, and has a function for supporting a back part 92 of a seat 90 which will be described below. The pair of side parts 71 of the back part frame 70 are respectively extended on both lateral sides of an upper body of a baby in the stroller 10. Meanwhile, the connection part 72 of the back part frame 70 is extended above a head of the baby in the stroller 10. Thus, there is provided a function for protecting the upper body of the baby in the stroller 10.

As shown by the two-dot chain lines in FIGS. 2 and 3, the stroller 10 further includes the seat 90 composed of a plate-like member having a certain degree of rigidity, and a fabric member covering the plate-like member. A seat part 91 of the seat 90 is supported by the upper connection bar 36 and the lateral connection members 32, and the back part 92 of the seat 90 is supported by the frame members 26 and the back part frame 70. The seat is shown by the two-dot chain lines in FIGS. 2 and 3, but is omitted in the other drawings.

As shown by the two-dot chain lines in FIGS. 2 and 3, the stroller 10 is provided with an adjusting mechanism 95 for adjusting a reclining angle of the back part 92 of the seat 90. The illustrated adjusting mechanism 95 includes a pair of string-like members 96 and a fixing device 97 for fixing the pair of string-like members 96. One end of each of the string-like members 96 is fixed on the corresponding (right or left) frame member 26. The respective string-like members 96 pass through an elongated insertion path formed in the back part 92 of the seat 90 so as to extend outside from the back part 92 via a common hole formed in substantially a center part of the back part 92. The fixing device 97 binds up and fixes the pair of string-like members 96 extending from the hole of the back part 92. As shown in FIG. 3, when the pair of string-like members 96, which are drawn outside from inside the back part 92 of the seat 90, are bound up and fixed by means of the fixing device 97, the back part 92 can be raised with respect to the seat part 91. On the other hand, as shown in FIG. 2, when the fixing device 97 is released so that the string-like members 96 are let into the back part 92, the back part 92 can be reclined with respect to the seat part 91.

As shown in FIGS. 1 to 3 and 6, the stroller 10 further includes a support member 75 whose opposed ends are respectively joined to the armrest 28 and to the back part frame 70 so as to connect the armrest and the back part frame with each other. The support member 75 has a flexibility so as to allow the back part frame 70 to be pivoted with respect to the stroller body 20 within a limited range. As shown in FIG. 2, when the fixing device 97 of the adjusting mechanism 95 does not maintain the string-like members 96 in a strained state, the back part frame 70 is inclined rearward from the stroller body 20, by a self weight of the back part frame 70 and a weight of the back part 92 of the seat 90. Even in this situation, the support member 75 prevents the back part frame 70 from leaning from the stroller body 20 over a predetermined inclination angle. On the other hand, as shown in FIG. 3, the deformation of the support member 75 makes it possible that the back part frame 70 is pivoted with respect to the stroller body 20 so as to come close to the frame members 26.

The support member 75 is formed of, e.g., a member (material) having a flexibility, such as a fabric member, a leather, a belt member and so on. At the same time, the support member 75 is formed of a member (material) having a certain degree of strength by which the support member 75 can effectively fulfill a function for supporting the back part frame 70 such that the back part frame 70 is not inclined over a predetermined inclination angle.

The support member 75 is positioned such that the support member 75 can transmit the pivoting action of the armrest 28 with respect to the frame member 26 during the folding action of the stroller body 20, which will be described below, and that the back part frame 70 can be pivoted with respect to the frame member 26 in conjunction with the pivoting movement of the armrest 28 with respect to the frame member 26. Attachment positions of the support member 75 to the back part frame 70 and to the armrest 28 will be described in detail below.

The stroller 10 (stroller body 20) having the above overall structure can be folded by pivoting the respective constituent elements each other in the following manner.

When the handle 50 is located on the first position, the handle 50 is firstly swung with respect to the stroller body 20 so as to move the handle 50 to the second position. Then, the handle 50 is fixed onto the stroller body 20, by means of the engagement between the sliding member 60 on the handle 50 located on the second position and the second engagement portion 30b on the frame member 26 of the stroller body 20. At this time, the handle 50, which is swingably joined, at a lower end thereof, to the frame member 26, is fixed onto the frame member 26, by means of the engagement between the sliding member 60 and the second engagement portion 30b. Then, during the following folding action, in side view (when observed along the lateral side), the lower portion of the handle 50 acts in the same manner as the frame member 26.

Then, by operating the remote operation device 57, the fixed state of the frame member 26 to the rear leg 24 is released. Specifically, the operation member 55 is caused to act by the remote operation device 57, and simultaneously therewith, the unlocking member 27 on the frame member 26 is caused to act through the operation member 55, so that the fixed state of the frame 26 to the rear leg 24 is released. Under this state, the handle 50 located on the second position is once pulled upward, and then pushed downward. At this time, as described above the frame member 26 acts together with the handle 50. Thus, the connection bracket 34 is pivoted clockwise with respect to the rear leg 24 in FIG. 2. In accordance with this operation, the armrest 28 and the lateral connection member 32 are pivoted clockwise with respect to the frame member 26 in FIG. 2. Due to such an operation, in side view (when observed along the lateral side), the handle 50 is moved close to the front leg 22, while a substantially parallel relationship between the handle 50 and the front leg 22 being maintained, whereby a size of the stroller 10 (stroller body 20) in the back and forth direction can be reduced.

Figure 4:
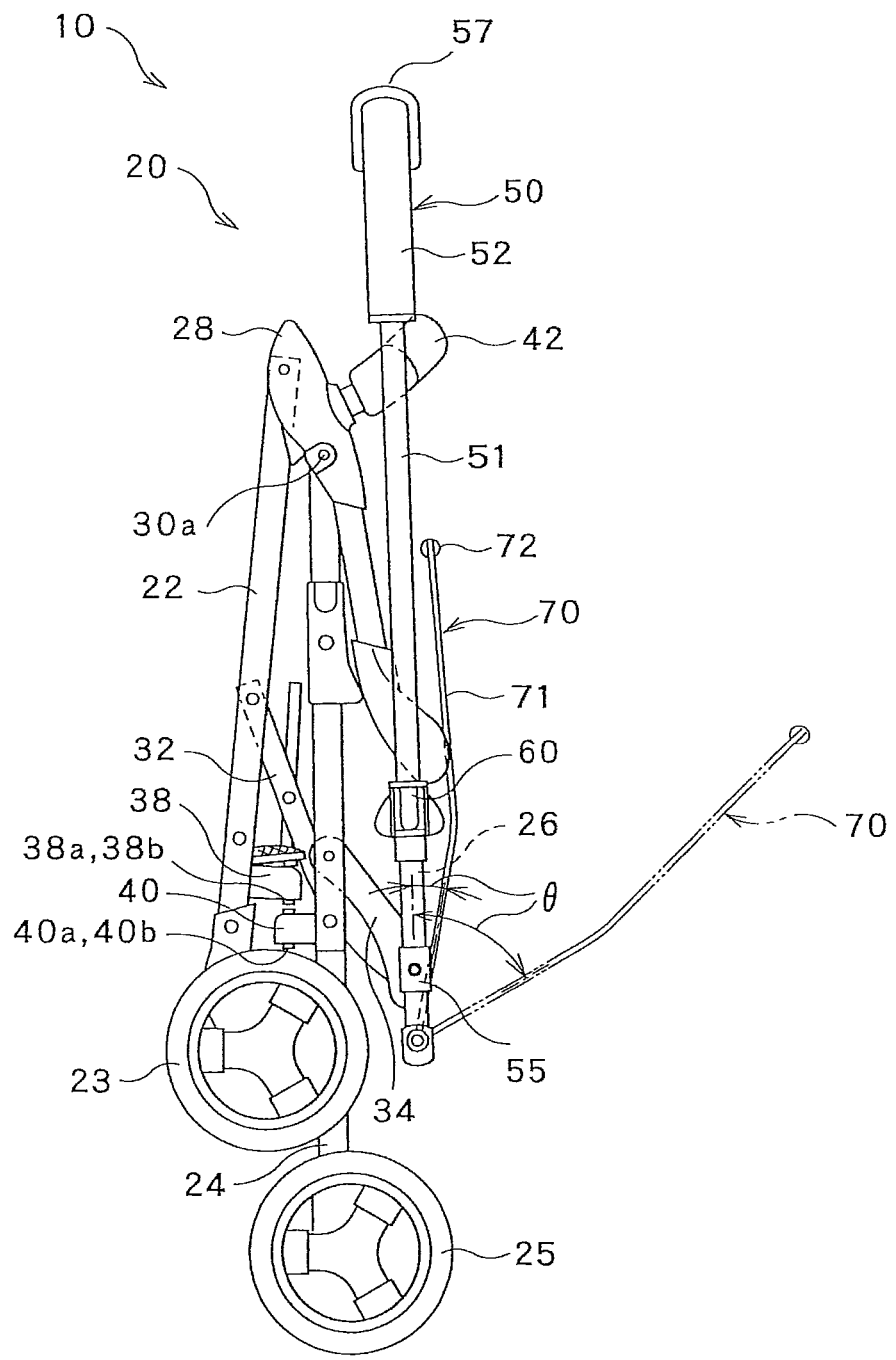
FIG. 4 is a side view showing the stroller folded in the back and forth direction.

As shown in FIG. 4, when the stroller 10 (stroller body 20) is folded in the back and forth direction as described above, the located position of the handle 50 is lowered, while the handle 50 and the front leg 22 being maintained substantially in parallel with each other. As a result, not only the size of the stroller 10 (stroller body 20) in the back and forth direction, but also the size of the stroller 10 (stroller body 20) in the up and down direction can be reduced.

Figure 5:
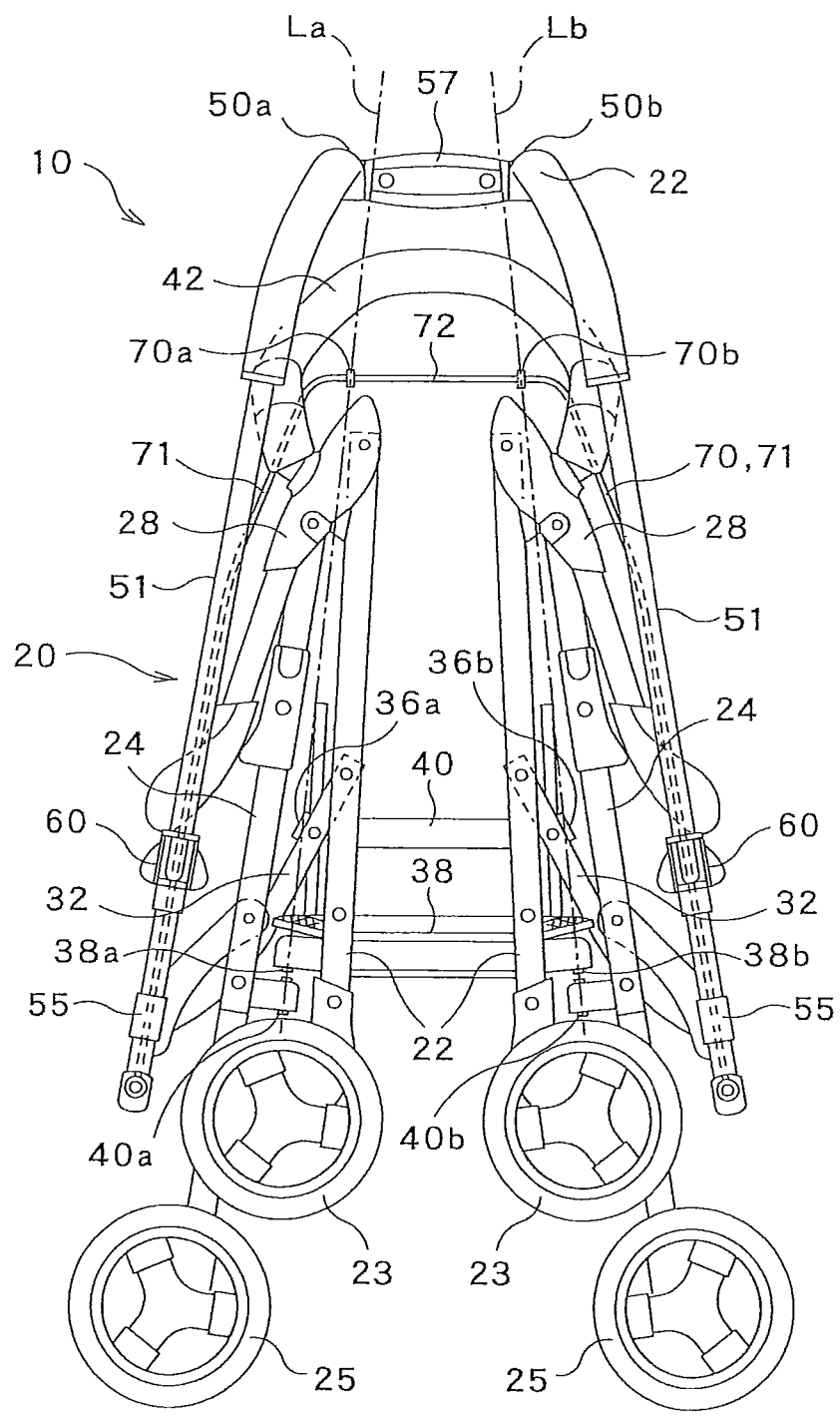
FIG. 5 is a front view of the stroller that is further folded in the width direction from the state shown in FIG. 4.

In the illustrated stroller, the upper connection bar 36, the footrest 38 and the rear connection bar 40 respectively have the pair of hinges 36a and 36b, the pair of hinges 38a and 38b and the pair of hinges 40a and 40b, which are spaced apart from each other along the width direction (see FIGS. 1 and 5). Similarly, the handle 50 has the pair of hinges 50a and 50b which are spaced apart from each other along the width direction. Further, the back part frame 70 has the pair of hinges 70a and 70b which are spaced apart from each other along the width direction. As shown in FIG. 5, when the stroller 10 is folded in the back and forth direction, one hinge 36a of the pair of hinges 36, one hinge 38a of the pair of hinges 38, one hinge 40a of the pair of hinges 40, one hinge 50a of the pair of hinges 50 and one hinge 70a of the pair of hinges 70 are located substantially an a first axis La, and the other hinge 36b, the other hinge 38b, the other hinge 40b, the other hinge 50b and the other hinge 70b are located substantially on a second axis Lb. As a result, the stroller 10 (stroller body 20) can be folded about the first axis La and the second axis Lb, whereby the widthwise size can be reduced.

On the other hand, in order to unfold the folded stroller 10 (stroller body 20), the above folding steps are reversely performed.

As shown in the two-dot chain lines in FIG. 4, although the stroller body 20 is folded in the back and forth direction, the size of the stroller 10 as a whole cannot be sufficiently reduced in the back and forth direction, as long as the back part frame 70 supporting the back part 92 of the seat 90 remains to be largely inclined with respect to the frame member 26, in side view (when observed along the lateral side). Further, in side view, when the stroller body 20 is folded in the back and forth direction, with the back part frame 70 being largely inclined with respect to the frame member 26, the hinges 70a and 70b of the back part frame 70 are located on positions significantly displaced from the axes La and Lb on which the hinges 36a and 36b of the lateral connection bar 36, the hinges 38a and 38b of the footrest 38, the hinges 40a and 40b of the rear connection bar 40, and the hinges 50a and 50b of the handle 50 are located. In this case, unlike the stroller 10 shown in FIG. 5, the stroller 10 folded in the back and forth direction cannot be further folded in the width direction.

In order to avoid this disadvantage, before or after the stroller body is folded, it is necessary to adjust the inclination of the back part frame 70 and the back part 92 of the seat 90, such that an inclination angle θ (see FIG. 4) of the back part frame 70 with respect to the frame member 26 in side view is made smaller, with the use of the adjusting mechanism 95. However, it is bothersome, for each time when the stroller body 20 is folded, to adjust the inclination angle θ of the back part frame 70 and the back part 92 of the seat 90 by means of the aforementioned adjusting mechanism 95, separately from the folding operation of the stroller body 20.

Figure 6:
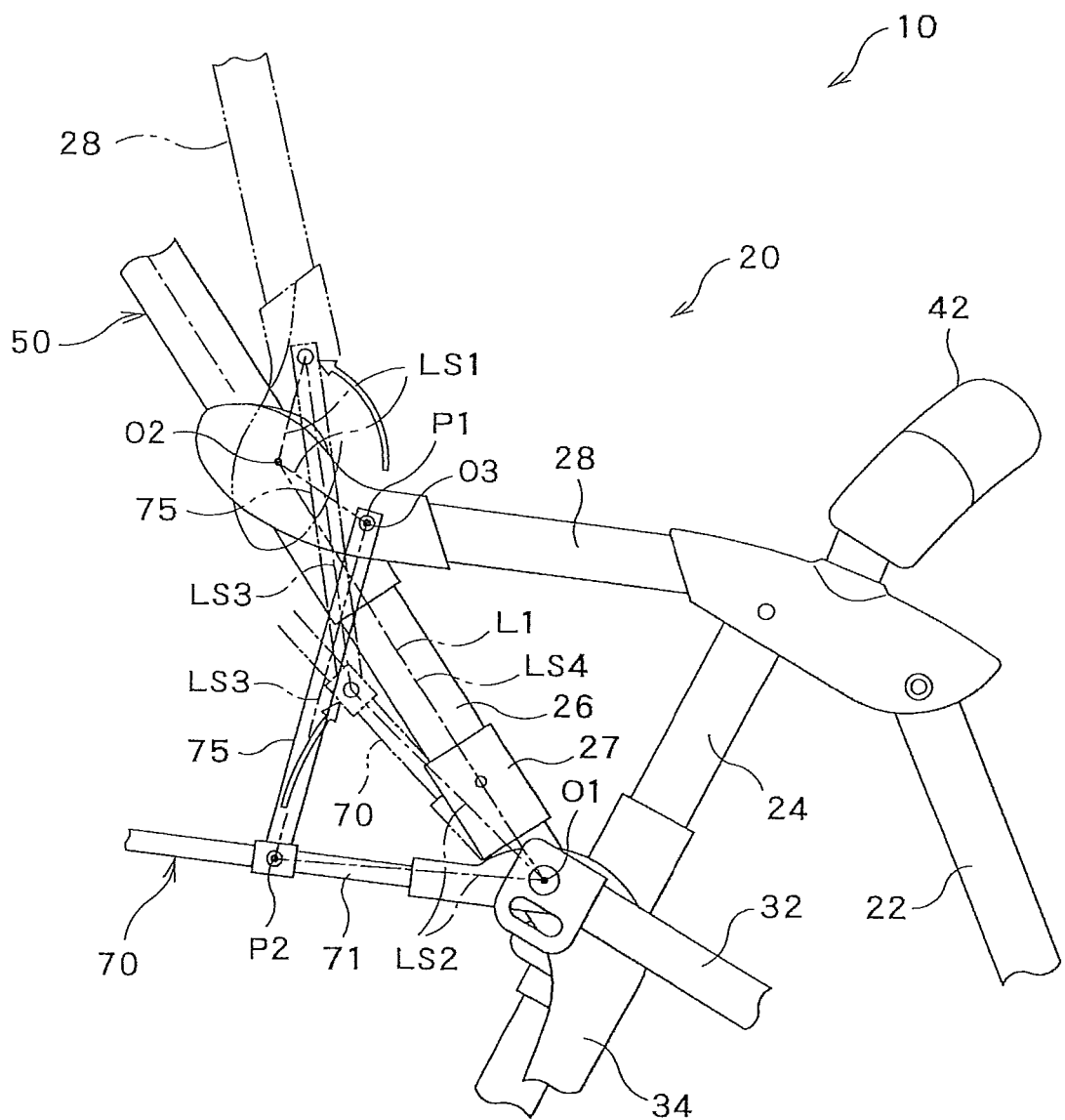
FIG. 6 is a view for explaining an operation of a support member, and is a side view showing a part including an armrest of the stroller, a frame member of the stroller and the support member of the stroller, from an inner side in the width direction.

However, according to this embodiment, as described above, there is provided the support member 75 joined respectively to the armrest 28 and to the back part frame 70 so as to connect the armrest 28 and the back part frame 70 with each other. The support member 75 is positioned such that the back part frame 70 is pivoted with respect to the stroller body (frame member 26), in conjunction with the pivoting movement of the armrest 28 with respect to the frame member 26 during the folding action of the stroller body 20. Thus, as shown in FIG. 6, when the armrest 28 is rotated with respect to the frame member 26 during the folding action of the stroller body 20, the pivoting action is transmitted by the support member 75 to the frame member 26, so that the back part frame 70 automatically rotates with respect to the stroller body 20, such that the inclination angle θ of the back part frame 70 with respect to the frame member 26 becomes smaller in side view.

Since such a support member 75 is formed of a member (material) having a flexibility, there are less constraints on the located position of the support member 75. Namely, as compared with a metal member and a plastic member having a rigidity, a degree of freedom in design can be remarkably improved, whereby a degree of freedom in design of a joint position of the back part frame 70 to the stroller body 20 can be significantly improved. At the same time, the support member 75 formed of a member (material) having a flexibility can be deformed, in accordance with the deformation of the stroller body 20 upon being folded, while stably fulfilling its function. Thus, even when the entire length of the support member 75 is elongated or even when the relative movement amount between the support members 75 with respect to the stroller body 20 is increased between the unfolded state of the stroller body 20 and the folded state thereof, the back part frame 70 can be stably rotated with respect to the stroller body 20 (frame member 26), in conjunction with the rotation movement of the armrest 28 with respect to the frame member 26 during the folding action of the stroller body 20. Namely, according to the support member 75 having a flexibility, the back part frame 70 can be stably raised in conjunction with the folding action of the stroller body 20, regardless of the joint position of the back part frame 70 to the stroller body 20.

Therefore, according to such a support member 75, the back part frame 70 can be located on a suitable position in order that the function for supporting the back part 92 of the seat 90 and the function for protecting an upper body of a baby are suitably imparted to the back part frame 70, as well as the back part frame 70 having these suitable functions can be stably pivoted with respect to the stroller body 20, in conjunction with the pivoting movement of the armrest 28 with respect to the frame member 26 during the folding action of the stroller body 20. That is to say, the entire size of the stroller 10 can be sufficiently reduced by folding the stroller 10 (stroller body 20) in the back and forth direction, without any complicated operation. In addition, the stroller 10 folded in the back and forth direction can be directly folded in the width direction.

In addition, the structure for raising the back part frame 70 in conjunction with the folding action of the stroller body 20 can be realized by the support member 75 that connects the armrest 28 and the back part frame 70, with a significantly simple structure formed of a flexible material. Further, the support member 75 serves not only as the member for pulling upward the back part frame 70 in conjunction with the folding action of the stroller body 20, but also as the member for restricting that the back part frame 70 is inclined with respect to the frame member 26 at the inclination angle θ over a predetermined angle, regardless of the adjustment by the adjusting mechanism 95. Thus, it is possible to not only simplify the structure for pulling upward the back part frame 70 in conjunction with the folding action of the stroller body 20, but also to remarkably simplify the structure of the stroller 10 as a whole. In addition, decrease in the number of components can be achieved, which is very advantageous in terms of manufacturing cost of the stroller 10.

In addition, in this embodiment, as described below with reference to FIG. 6, the structure for pulling upward the back part frame 70 in conjunction with the folding action of the stroller body 20 is simplified, by means of concrete joint positions of the support member 75 to the back part frame 70 and to the armrest 28. Thus, the rising operation of the back part frame 70 in conjunction with the folding action of the stroller body 20 can be more stably ensured, without depending on the joint position of the back part frame 70 to the stroller body 20.

As shown in FIG. 6, according to this embodiment, the armrest 28 is swingably joined, at an end portion thereof, to the frame member 26, and the side part 71 of the back part frame 70 is swingably joined, at an end portion thereof, to the frame member 26. The support member 75 is joined to the armrest 28 at a position P1 on the armrest 28, which is more distant from the pivot axis line O1 of the back part frame 70 with respect to the stroller body 20 when in the folded state (state shown by the two-dot chain lines in FIG. 6) than in the unfolded state (state shown by the solid lines in FIG. 6). In other words, the joint position P1 of the support member 75 to the armrest 28 is more distant from the pivot axis line O1 of the back part frame 70 with respect to the stroller body 20 when in the folded state than in the unfolded state. According to such a support member 75, the support member 75 can be moved upward in conjunction with the folding action of the stroller body 20 by means of the extremely simple structure, and the back part frame 70 can be more reliably and more stably pulled upward in conjunction with the upward movement of the support member 75.

Moreover, according to the stroller 10 in this embodiment, in the unfolded state, the joint position P1 of the support member 75 to the armrest 28 is closer to the pivot axis line O1 of the back part frame 70 with respect to the stroller body 20 than the pivot axis line O2 of the armrest 28 with respect to the frame member 26 is. In the folded state, the pivot axis line O2 of the armrest 28 with respect to the frame member 26 is closer to the pivot axis line O1 of the back part frame 70 with respect to the stroller body 20 than the joint position P1 of the support member 26 to the armrest 28 is. In other words, a length from the joint position P1 of the support member 75 to the armrest 28 to the pivot axis line O1 of the back part frame 70 with respect to the stroller body 20, in side view, is shorter in the unfolded state and is longer in the folded state, than a length from the pivot axis line O2 of the armrest 28 with respect to the frame member 26 to the pivot axis line O1 of the back part frame 70 with respect to the stroller body 20, in side view. According to such a support member 75, a large pivoting amount of the back part frame 70 with respect to the stroller body 20 in conjunction with the pivoting movement of the armrest 28 during the folding action of the stroller body 20. Thus, it is possible to ensure the large pulling up amount of the back part frame 70 in conjunction with the folding action of the the stroller body 20, and to stabilize the pulling up action of the back part frame 70 in conjunction with the folding action of the stroller body 20.

Further, according to this embodiment, the armrest 28 is pivotably joined, at its end portion, to the upper end portion of the frame member 26, and the side part 71 of the back part frame 70 is pivotably joined, at its end portion, to the lower end portion of the frame member 26. In side view, i.e., when observed along a direction in parallel with the pivot axis line O1 of the back part frame 70 with respect to the stroller body 20, the joint position P2 of the support member 75 to the back part frame 70 is located on the same side in the unfolded state and in the folded state, with respect to a straight line L1 connecting the pivot axis line O1 of the back part frame 70 with respect to the stroller body 20 and the pivot axis line O2 of the armrest 28 with respect to the frame member 26, and the joint position P1 of the support member 75 to the armrest 28 is located on the same side in the unfolded state and in the folded state, with respect to the straight line L1 connecting the pivot axis line O1 of the back part frame 70 with respect to the stroller body 20 and the pivot axis line O2 of the armrest 28 with respect to the frame member 26. Furthermore, in side view, when the stroller is folded from the unfolded state to the folded state, a straight line segment LS2 connecting the pivot axis line O1 of the back part frame 75 with respect to the stroller body 20 and the joint position P2 of the support member 75 to the back part frame 70 does not rotate so as to pass the straight line L1 connecting the pivot axis line O1 and the pivot axis line O2 (i.e., when the stroller is folded from the unfolded state to the folded state, the joint position P2 is moved so as not to cross the straight line L1), and when the stroller is folded from the unfolded state to the folded state, a straight line segment LS1 connecting the pivot axis line O2 of the armrest 28 with respect to the frame member 26 and the joint position P1 of the support member 75 to the armrest 28 does not rotate so as to pass the straight line L1 connecting the pivot axis line O1 and the pivot axis line O2 (i.e., when the stroller is folded from the unfolded state to the folded state, the joint position P1 is also moved so as not to cross the straight line L1). Note that the joint position P1 of the support member 75 to the armrest 28 and the joint position P2 of the support member 75 to the back part frame 75 are located on the opposed sides with respect to the straight line L1 connecting the pivot axis line O1 and the pivot axis line O2. According to such an embodiment, the located position of the support member 75 and the movement path thereof are significantly simplified, so that the structure for pulling upward the back part frame 70 in conjunction with the pivoting movement of the armrest 28 during the folding action of the stroller body 20 can be remarkably simplified. Thus, it is easy to determine the joint positions P1 and P2 of the support member 75 to the armrest 28 and to the back part frame 70. Furthermore, fine adjustment among the members is no more needed, whereby a degree of freedom in design of the joint positions of the back part frame 70 to the stroller body 20 can be significantly improved.

As a result, in side view, i.e., when observed along a direction in parallel with the pivot axis line O1 of the back part frame 70 with respect to the stroller body 20, a straight line segment LS3 connecting the joint position P2 of the support member 75 to the back part frame 70 and the joint position P1 of the support member 75 to the armrest 28 intersects with a straight line segment LS4 connecting the pivot axis line O1 of the back part frame 70 with respect to the stroller body 20 and the pivot axis line O2 of the armrest 28 with respect to the frame member 26. However, since the support member 75 has a flexibility, the support member 75 can be suitably deformed to be smoothly moved to follow the pivoting movement of the armrest 26 during the folding action.

In addition, in this embodiment, the support member 75 is pivotably joined to at least one of the armrest 28 and the back part frame 70. In the example shown in FIG. 6, the support member 75 is pivotably joined to the armrest 28. A pivot axis line O3 of the support member 75 with respect to the armrest 28 extends in the width direction (lateral direction) of the stroller 10, in parallel with the pivot axis line O2 between the armrest 28 and the frame member 26. According to such an embodiment, the support member 75 is operated to smoothly follow the action of the armrest 28 during the folding action. In addition, as shown in FIG. 3, when the inclination of the back part 92 of the seat 90 is adjusted with respect to the seat part 91 by using the adjusting mechanism 95, the support member 75 is operated to smoothly follow the action of the back part 92 of the seat 90 and the back part frame 70. Since the action of the support member 75 can be made smooth, maneuverability of the stroller 10 can be remarkably enhanced.

As described above, according to this embodiment, there is provided the support member 75 joined respectively to the armrest 28 and the back part frame 70 so as to connect the armrest 28 and the back part frame 70 with each other. The support member 75 is positioned such that the back part frame 70 is pivoted with respect to the stroller body 20 (frame member 26), in conjunction with the pivoting movement of the armrest 28 with respect to the frame member 26 during the folding action of the stroller body 20. Due to the synergy effect of the flexibility of the support member 75 and the located position of the support member 75, it is possible to stably pivot, regardless of the located position of the back part frame 70, the back part frame 70 with respect to the stroller body 20, in conjunction with the folding action of the stroller body 20 (stroller 10), while the stroller 10 has a simple structure.

The aforementioned embodiment can be variously modified within a scope of the present invention. Modification examples are described below.

For example, the overall structure of the stroller 10 described in the above embodiment is nothing more than an example. For example, the stroller 10 may be configured to be capable of being folded in the back and forth direction as shown in FIG. 4 but incapable of being folded in the width direction as shown in FIG. 5.

Figure 7:
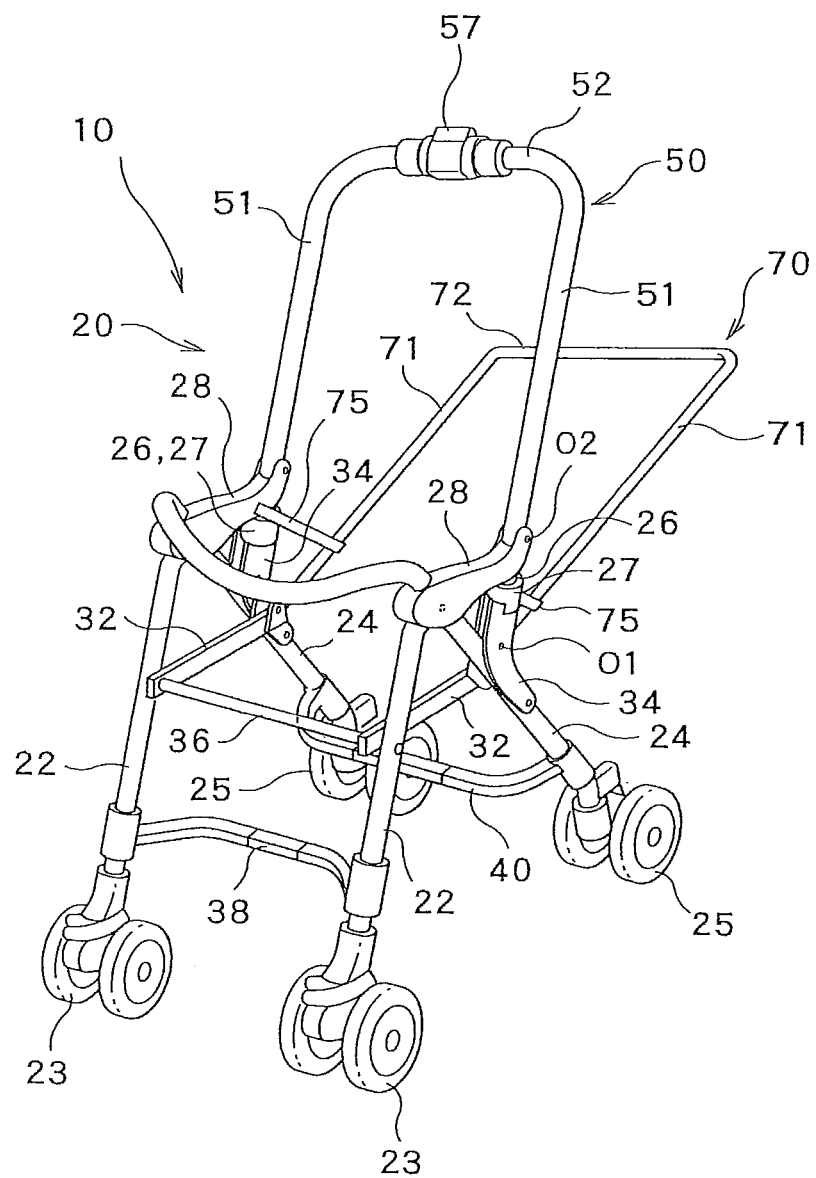
FIG. 7 is a view corresponding to FIG. 1, and is a perspective view showing a modification example of the stroller.

In the aforementioned embodiment, although the handle 50 is provided separately from the frame member 26, and the handle 50 is made swingable with respect to the stroller body 20, the present invention is not limited thereto. For example, as shown in FIG. 7, the handle 50 may be fixed on the second position such that the handle 50 cannot be swung from the second position. In the example shown in FIG. 7, the pair of frame members 26 are constituted by the portions corresponding to the end portions of U-shape of the U-shaped handle 50. In other words, the frame members 26 constitute parts of the handle 50, and the handle 50 itself is incorporated in the stroller body 20. The stroller 10 including such a stroller body 20, and the back part frame 70 and the support member 75 in the aforementioned embodiment can provide the same effect as that of the aforementioned embodiment.

Further, in the aforementioned embodiment, the support member 75 is pivotably joined to the armrest 28. However, not limited thereto, the support member 75 may be pivotably joined to the back part frame 70 or the support member 75 may be pivotably joined to the armrest 28.

Although some modification examples of the above embodiment are described, it is naturally possible to suitably combine the plurality of modification examples.

The invention claimed is:

1. A foldable stroller comprising:
a stroller body including a frame member and an armrest pivotably joined to the frame member, the stroller body being capable of being folded from an unfolded state to a folded state;
a back part frame joined to the stroller body for supporting a back part of a seat to be mounted on the stroller body, the back part frame being pivotable with respect to the stroller body about an axis line whose relative position with respect to the frame member is constant during a folding action of the stroller body; and
a support member joined to the armrest and to the back part frame so as to connect the armrest and the back part frame with each other, the support member having a flexibility so as to allow the back part frame to be pivoted with respect to the stroller body within a predetermined range;
wherein the support member is positioned such that the back part frame is pivoted with respect to the stroller body, in conjunction with a pivoting movement of the armrest with respect to the frame member during the folding action of the stroller body,
when observed along a direction in parallel with a pivot axis line of the back part frame with respect to the stroller body,
a joint position of the support member to the back part frame is located on the same side in the unfolded state and in the folded state, with respect to a straight line connecting the pivot axis line of the back part frame with respect to the stroller body and a pivot axis line of the armrest with respect to the frame member,
a joint position of the support member to the armrest is located on the same side in the unfolded state and in the folded state, with respect to the straight line connecting the pivot axis line of the back part frame with respect to the stroller body and the pivot axis line of the armrest with respect to the frame member, and
a straight line segment connecting a joint position of the support member to the back part frame and a joint position of the support member to the armrest intersects with a straight line segment connecting a pivot axis line of the back part frame with respect to the stroller body and a pivot axis line of the armrest with respect to the frame member in the unfolded state and in the folded state.

2. The foldable stroller according to claim 1, wherein the support member is joined at a position on the armrest, the position being more distant from a pivot axis line of the back part frame with respect to the stroller body, when in the folded state than in the unfolded state.

3. The foldable stroller according to claim 1, wherein when in the unfolded state, a joint position of the support member to the armrest is closer to a pivot axis line of the back part frame with respect to the stroller body than a pivot axis line of the armrest with respect to the frame member is, and
when in the folded state, the pivot axis line of the armrest with respect to the frame member is closer to the pivot axis line of the back part frame with respect to the stroller body than the joint position of the support member to the armrest is.

4. The foldable stroller according to claim 1, wherein the support member is pivotably joined to at least one of the armrest and the back part frame.

5. The foldable stroller according to claim 1, wherein when the armrest is pivoted with respect to the frame member during the folding action of the stroller body, the back part frame is pivoted with respect to the stroller body such that an inclination angle of the back part frame with respect to the frame member becomes smaller in side view.

6. The foldable stroller according to claim 1, wherein the stroller body further includes a front leg and a rear leg which are pivotably joined to the armrest, and a connection bracket pivotably joined to the rear leg and to the frame member so as to connect the rear leg and the frame member with each other, and
the back part frame is pivotable with respect to the stroller body about an axis line which is the same as a pivot axis line between the frame member and the connection bracket.

7. The foldable stroller according to claim 1 further comprising a handle swingable with respect to the stroller body.

8. The foldable stroller according to claim 1, wherein the frame member constitutes a handle.

* * * * *